United States Patent
Dziuba et al.

(10) Patent No.: US 10,181,105 B2
(45) Date of Patent: Jan. 15, 2019

(54) OBJECT ORIENTED ORGANIZATION MANAGEMENT WITH DYNAMIC GROUPING

(71) Applicant: ADP, LLC, Roseland, NJ (US)

(72) Inventors: Benjamin John Dziuba, New York, NY (US); Keith Wilson Fulton, South Orange, NJ (US); Edwin Charbel Baladi, New York, NY (US)

(73) Assignee: ADP, LLC, Roseland, NJ (US)

( * ) Notice: Subject to any disclaimer, the term of this patent is extended or adjusted under 35 U.S.C. 154(b) by 278 days.

(21) Appl. No.: 14/966,874

(22) Filed: Dec. 11, 2015

(65) Prior Publication Data

US 2017/0168663 A1 Jun. 15, 2017

(51) Int. Cl.
G06F 3/048 (2013.01)
G06Q 10/06 (2012.01)
G06F 3/0482 (2013.01)
G06F 3/0481 (2013.01)

(52) U.S. Cl.
CPC ....... G06Q 10/0631 (2013.01); *G06F 3/0482* (2013.01); *G06F 3/04817* (2013.01)

(58) Field of Classification Search
CPC .............. G06F 3/0482; G06F 3/04817; G06Q 10/0631
See application file for complete search history.

(56) References Cited

U.S. PATENT DOCUMENTS

| | | | |
|---|---|---|---|
| 6,640,244 B1 | 10/2003 | Bowman-Amuah | |
| 6,996,569 B1 | 2/2006 | Bedell et al. | |
| 7,065,493 B1 | 6/2006 | Homsi | |
| 7,206,851 B2 | 4/2007 | Delaney et al. | |
| 8,473,593 B1 | 6/2013 | Graham et al. | |
| 8,798,519 B2 | 8/2014 | Dozier et al. | |
| 8,819,055 B2 | 8/2014 | Rangaswamy et al. | |
| 9,710,134 B1 * | 7/2017 | Russell | G06F 3/0482 |
| 2003/0110185 A1 * | 6/2003 | Rhoads | G01C 21/32 |
| 2004/0122683 A1 * | 6/2004 | Grossman | G06Q 10/10 715/864 |
| 2005/0166157 A1 * | 7/2005 | Ollis | G06F 3/0482 715/764 |
| 2005/0182798 A1 * | 8/2005 | Todd | G06F 3/0482 |

(Continued)

FOREIGN PATENT DOCUMENTS

WO WO0116704 A2 3/2001

OTHER PUBLICATIONS

"Manage Your Contacts and Contacts LisList"—Microsoft Lync 2010, https://support.office.com/en-us/article/Manage-your-contacts-and-Contacts-list-dab4aee5-0a39-41c6-8edc-fbbb3027f859 (Year: 2011).*

(Continued)

*Primary Examiner* — Patrick F Riegler
(74) *Attorney, Agent, or Firm* — Yee & Associates, P.C.

(57) ABSTRACT

A computer system comprises a display system and a workflow adapter in communication with the display system. The workflow adapter identifies an object within a network. The workflow adapter then received a selection of the object. In response to receiving the selection of the object, the workflow adapter creates a custom group that includes the object. The custom group is a loose association of objects within the network and does not exist as a separate object within the network. The workflow adapter then performs an operation on the group.

24 Claims, 14 Drawing Sheets

(56) References Cited

U.S. PATENT DOCUMENTS

| | | | |
|---|---|---|---|
| 2007/0266054 A1* | 11/2007 | Stephens | G06Q 10/06 |
| 2009/0187537 A1* | 7/2009 | Yachin | G06F 17/30864 |
| 2010/0011342 A1 | 1/2010 | Bhattacharyya et al. | |
| 2010/0070945 A1 | 3/2010 | Tattrie et al. | |
| 2010/0100427 A1* | 4/2010 | McKeown | G06Q 10/067 |
| | | | 705/322 |
| 2012/0084372 A1* | 4/2012 | Cohen | G06F 3/0482 |
| | | | 709/206 |
| 2013/0031184 A1* | 1/2013 | Avitabile | G06Q 10/10 |
| | | | 709/206 |
| 2013/0103758 A1* | 4/2013 | Alison | G06Q 30/02 |
| | | | 709/204 |
| 2013/0159203 A1* | 6/2013 | Munzer | G06Q 10/105 |
| | | | 705/321 |
| 2013/0268603 A1* | 10/2013 | Aldosari | G06Q 50/01 |
| | | | 709/206 |
| 2014/0053110 A1* | 2/2014 | Brown | G06F 3/0481 |
| | | | 715/853 |
| 2014/0122605 A1* | 5/2014 | Merom | H04L 67/306 |
| | | | 709/204 |
| 2014/0164495 A1 | 6/2014 | Farver et al. | |
| 2014/0297550 A1* | 10/2014 | Miller | G06Q 10/1053 |
| | | | 705/321 |
| 2015/0019979 A1* | 1/2015 | Alden | H04W 24/02 |
| | | | 715/736 |
| 2015/0026606 A1* | 1/2015 | Hill | G06F 17/3089 |
| | | | 715/760 |
| 2015/0120406 A1* | 4/2015 | Ekberg | G06F 17/30867 |
| | | | 705/14.5 |
| 2015/0172403 A1* | 6/2015 | Steinbok | H04L 67/24 |
| | | | 709/205 |
| 2015/0293947 A1* | 10/2015 | Bhagavan | G06F 17/30315 |
| | | | 707/802 |

OTHER PUBLICATIONS

"Skype for Business—Wikipedia", https://en.wikipedia.org/wiki/Skype_for_Business (Year: 2011).*

\* cited by examiner

OBJECT ORIENTED ORGANIZATION MANAGEMENT WITH DYNAMIC GROUPING

BACKGROUND INFORMATION

1. Field

The present disclosure relates generally to an improved computer system and, in particular, to a method and apparatus for performing repetitive operations on a database in a computer system. Still more particularly, the present disclosure relates to a method and apparatus for performing repetitive operations on a database by creating custom groups of individuals in a computer system.

2. Background

Information systems are used for many different purposes. For example, an information system may be used to process payroll to generate paychecks for employees in an organization. Additionally, an information system also may be used by a human resources department to maintain benefits and other records about employees. For example, a human resources department may manage health insurance, wellness plans, and other programs and organizations using an employee information system. As yet another example, an information system may be used to determine when to hire new employees, assign employees to projects, perform reviews for employees, and other suitable operations for the organization. As another example, a research department in the organization may use an information system to store and analyze information to research new products, perform reviews of employees, hire new employees, analyze products, or for other suitable operations.

Currently used information systems include databases. These databases store information about the organization. For example, these databases store information about employees, products, research, product analysis, business plans, and other information about the organization.

The information systems may be used in performing operations for an organization. The operations may include hiring operations and project assignments.

Frequently, individual employees responsible for performing operations for an organization may need to perform the same administrative action on various individuals or assets across the organization in the information system. Existing systems may require employees to perform the same administrative action on each of the individuals or assets.

Therefore, it would be desirable to have a method and apparatus that take into account at least some of the issues discussed above, as well as other possible issues. For example, it would be desirable to have a method and apparatus that overcome a technical problem of performing repetitive operations on a database that make performing operations for an organization more cumbersome and time-consuming than desired.

SUMMARY

An embodiment of the present disclosure provides a method for creating custom groups and workflows for individuals in an organization. A computer system identifies an object within a network. The computer system then perceives a selection of the object. In response to receiving the selection of the object, the computer system creates a custom group includes the object. The custom group is a loose association of objects within the network and does not exist as a separate object within the network. The computer system then performs an operation on the custom group.

Another embodiment of the present disclosure provides a computer system comprising a display system and a workflow adapter in communication with the display system. The workflow adapter identifies an object within a network. The workflow adapter then received a selection of the object. In response to receiving the selection of the object, the workflow adapter creates a custom group that includes the object. The custom group is a loose association of objects within the network and does not exist as a separate object within the network. The workflow adapter then performs an operation on the group.

Yet another embodiment of the present disclosure provides computer program product for creating custom groups and workflows for individuals in an organization comprising a computer readable storage media, and first program code, second program code, third program code, and fourth program code stored on the computer readable storage media. The first program code is configured, when executed by a processor, to identify an object within a network. The second program code is configured, when executed by the processor, to receive a selection of the object. The third program code is configured, when executed by the processor, to create a custom group that includes the object in response to receiving the selection of the object. The custom group is a loose association of objects within the network and is not exist as a separate object within the network. The fourth program code is configured, when executed by the processor, to perform an operation on the custom group.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 4 is an illustration of a graphical user interface for viewing a card depicted in accordance with an illustrative embodiment;

FIG. 5 is an illustration of a graphical user interface viewing cards depicted in accordance with an illustrative embodiment;

FIG. 7 is an illustration of a graphical user interface for incorporating additional cards into a custom group depicted in accordance with an illustrative embodiment;

FIG. 10 is an illustration of a graphical user interface for selecting custom groups and workflows depicted in accordance with an illustrative embodiment;

DETAILED DESCRIPTION

The illustrative embodiments recognize and take into account one or more different considerations. For example, the illustrative embodiments recognize and take into account that an employer may need to perform certain operations. The illustrative embodiments also recognize and take into account that performing these operations may be more cumbersome and time-consuming than desirable.

Figure 1:
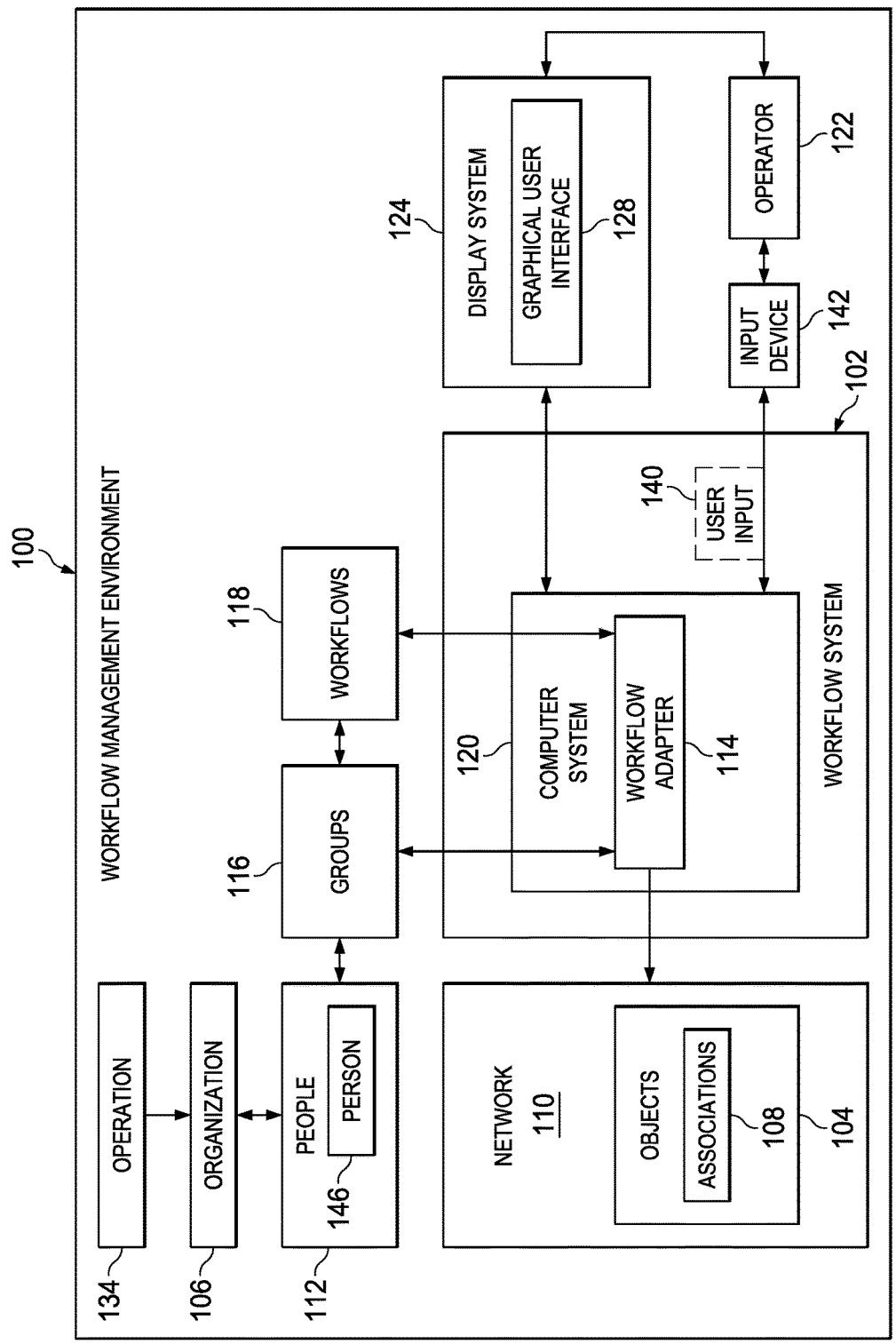
FIG. 1 is an illustration of a block diagram of workflow management environment depicted in accordance with an illustrative embodiment.

With reference now to the figures and, in particular, reference to FIG. 1, an illustration of a block diagram of a workflow management environment is depicted in accordance with an illustrative embodiment. In this illustrative example, workflow management environment 100 includes workflow system 102. Workflow system 102 provides access to objects 104. The access of information may be at least one of reading, writing, modifying, storing, or deleting objects 104.

Each of objects 104 exist as a discrete object within organization 106. Objects 104 may represent, for example at least one of an individual having a relationship with organization 106, an asset of organization 106, or other suitable information. Individuals and assets of organization 106 can be, for example at least one of people, products, offices, departments, services, business plans, performance reviews, payroll, human resources, benefits administration, business plans, marketing, research, product development, or other suitable information.

Objects 104 have associations 108 with others of objects 104. Associations 108 are relationships that link one of objects 104 to another one of objects 104. Associations 108 can be, for example but not limited to, at least one of connections among employees, customers, vendors, products, goals, activities, deliverables, and other assets of organization 106.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In the illustrative example, organization 106 may be, for example, a corporation, a partnership, a charitable organization, a city, a government agency, or some other suitable type of organization. People 112 may be employees of organization 106. In other illustrative examples, people 112 may be members of organization 106 without being employees. People 112 are represented as objects 104 in network 110.

Workflow system 102 provides access to objects 104. For example, workflow system 102 may be used for at least one of payroll, benefits administration, product development, marketing, or other suitable purposes in organization 106.

In one illustrative example, workflow adapter 114 may be used to perform at least one of creating customized groups 116 of objects 104 and creating customized workflows 118 for at least one of objects 104 and groups 116. As depicted, workflow adapter 114 may be implemented in software, hardware, firmware or a combination thereof. When software is used, the operations performed by workflow adapter 114 may be implemented in program code configured to run on hardware, such as a processor unit. When firmware is used, the operations performed by workflow adapter 114 may be implemented in program code and data and stored in persistent memory to run on a processor unit. When hardware is employed, the hardware may include circuits that operate to perform the operations in workflow adapter 114.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

As depicted, workflow adapter 114 may be implemented in computer system 120. Computer system 120 is a hardware system that includes one or more data processing systems. When more than one data processing system is present, those data processing systems may be in communication with each other using a communications medium. The communications medium may be a network. The data processing systems may be selected from at least one of a computer, a server computer, a tablet, or some other suitable data processing system.

In the illustrative example, operator 122 may interact with workflow adapter 114 in computer system 120 to access objects 104 and associations 108 between objects 104. For example, operator 122 may interact with workflow adapter 114 in workflow system 102 to create customized groups 116 of objects 104 or creating customized workflows 118 for at least one of objects 104 and groups 116.

As depicted, operator 122 may interact with workflow adapter 114 using display system 124 and input device 142. Graphical user interface 128 is displayed on display system 124 and provides visualization of objects 104 and associations 108 between objects 104. Additionally, graphical user interface 128 provides interaction with workflow adapter 114.

In the illustrative example, groups 116 and workflows 118 do not exist as objects 104 within network 110. Instead, workflow adapter 114 creates groups 116 and workflows 118 as a loose association of objects 104, for the benefit of operator 122. Groups 116 and workflows 118 allow repetitious user input 140 for operations 144 affecting people 112 that would otherwise require an individual operation for each person 146 to be reduced to a single user input 140 directed to the customized groups 116 and customized workflows 118. In this manner, operation 144 can be performed more quickly and accurately by using workflow adapter 114.

In an illustrative example, in creating groups 116 and workflows 118, backend data can take the form of key-value pair associative arrays for easy association of different objects 104. An associative array is an abstract data type composed of a collection of (key, value) pairs, such that each possible key appears lust once in the collection. The association between a key and a value is often known as a "binding." Operations associated with an associative array allow the addition of pairs to the collection, the removal of pairs from the collection, the modification of the values of existing pairs, and the lookup of the value associated with a particular key.

As depicted, display system 124 is a hardware system and includes one or more display devices on which graphical user interface 128 may be displayed. The display devices may include at least one of a light emitting diode display (LED), a liquid crystal display (LCD), an organic light emitting diode display (OLED), or some other suitable device on which graphical user interface 128 can be displayed. Operator 122 may interact with graphical user interface 128 through user input 140 generated by input device 142. Input device 142 may be, for example, a mouse, a keyboard, a trackball, a touchscreen, a stylus, or some other suitable type of input device.

In operation, workflow adapter 114 in computer system 120 provides a method for creating customized groups 116 of objects 104 and creating customized workflows 118 for at least one of objects 104 and groups 116. Workflow adapter 114 identifies objects 104 and their associations 108 within network 110. Network 110 is located in at least one of workflow system 102 or outside of workflow system 102. For example, network 110 may include at least one of a local area network (LAN), a wide area network (WAN), the Internet, an intranet, or some other suitable type of network.

Workflow adapter 114 identifies objects 104 and associations 108 found in network 126. Objects 104 and associations 108 are then manipulated by workflow adapter 114 to create groups 116 and workflows 118. Operator 122 can then utilize groups 116 and workflows 118 to perform operation 144 for organization 106 in this illustrative example. Operation 144 can be selected from at least one of hiring, benefits administration, payroll, performance reviews, forming teams for new products, assigning research projects, or other suitable operations for organization 106.

As depicted, workflow adapter 114 creates customized groups 116 of objects 104 and customized workflows 118 for at least one of objects 104 and groups 116. Operator 122 can then use groups 116 and workflows 118 to perform operation 144 for organization 106.

As a result, operator 122 can more efficiently perform operation 144 based on creation of customized groups 116 of objects 104 and customized workflows 118 using workflow adapter 114. Repetitive operations affecting people 112 that would otherwise require an individual operation for each person 146 can be reduced to a single operation for at least one of customized groups 116 and customized workflows 118. In this manner, operation 144 can be performed more quickly and accurately by using workflow adapter 114.

The illustrative example in FIG. 1 and the examples in the other subsequent figures provide one or more technical solutions to overcome a technical problem of having amounts of information that make the managing of assets and performing operations on those assets people more cumbersome and time-consuming than desired. For example, workflow adapter 114 creates customized groups 116 of objects 104 and creates customized workflows 118 for at least one of objects 104 and groups 116. As another example, workflow adapter 114 enables operator 122 to more efficiently perform operation 144 based on creation of customized groups 116 of objects 104 and customized workflows 118.

In this manner, the use of workflow adapter 114 has a technical effect of reducing time, effort, or both in managing of assets of organization 106. In this manner, operation 144 performed for organization 106 may be performed more efficiently as compared to currently used systems for managing assets and workflows for people 112. For example, groups 116 and workflows 118 may be used to enable operation 144, selected from at least one of hiring, benefits administration, payroll, performance reviews, forming teams for new products, assigning research projects, or other suitable operations for organization 106.

As a result, computer system 120 operates as a special purpose computer system in which workflow adapter 114 in computer system 120 enables creation of customized groups 116 of objects 104 and customized workflows 118. For example, a workflow adapter 114 enables creating of customized groups 116 of objects 104 and customized workflows 118 to more efficiently perform operation 144. For example, repetitive operations affecting people 112 that would otherwise require an individual operation for each person 146 can be reduced to a single operation for at least one of customized groups 116 and customized workflows 118. In this manner, operation 144 can be performed more quickly and accurately by using workflow adapter 114.

Thus, workflow adapter 114 transforms computer system 120 into a special purpose computer system as compared to currently available general computer systems that do not have workflow adapter 114. Currently used general computer systems do not reduce the time or effort needed to efficiently perform operation 144 based on creation of customized groups 116 of objects 104 and customized workflows 118.

Figure 2:
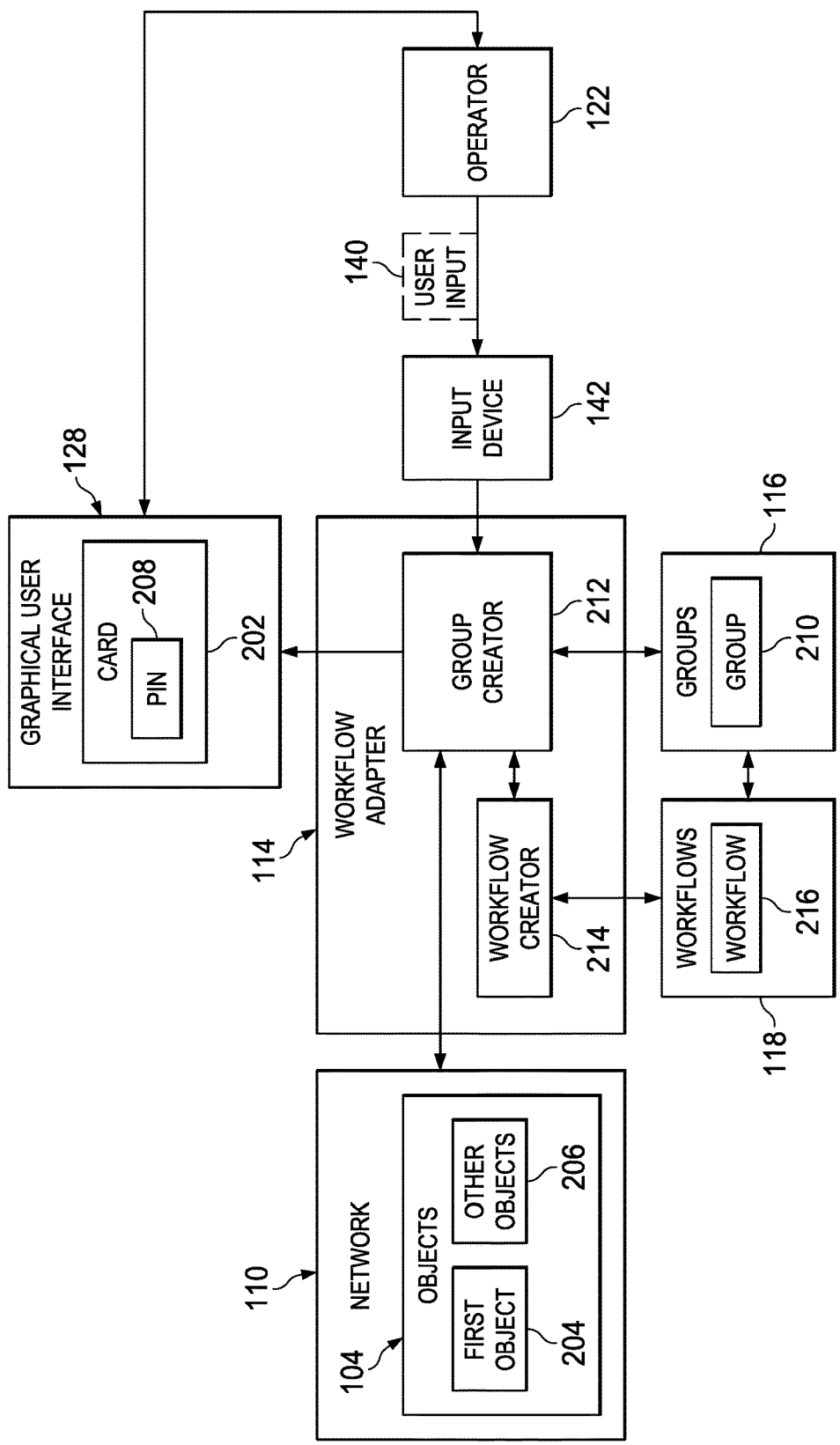
FIG. 2 is an illustration of a block diagram of data flow for creating customized groups and customized workflows in an organization depicted in accordance with an illustrative embodiment.

With reference next to FIG. 2, an illustration of a block diagram of data flow for creating customized groups and customized workflows in an organization is depicted in accordance with an illustrative embodiment. In this figure, an example of data flow in which user input 140 is received from operator 122 identifying objects 104 to be included in groups 116 or workflows 118 through workflow adapter 114 is shown. In the illustrative examples, the same reference numeral may be used in more than one figure. This reuse of a reference numeral in different figures represents the same element in the different figures.

As depicted, graphical user interface 122 displays cards 202. Cards 202 are visual representations of at least one of objects 104, groups 116, and workflows 118, displayed in graphical user interface 128. User input 140 interacting with cards 202 allows operator 122 to navigate to different points of cards 202, displaying cards 202 for different objects 104, groups 116, and workflows 118 in graphical user interface 122.

In an illustrative embodiment, user input 140 interacting with cards 202 allows operator 122 to navigate between objects 104 of network 110 according to associations 108 of FIG. 1. For example, operator 122 views a first card displayed on graphical user interface 122. The first card is one of cards 202 and is a visual representation of first object 204 in objects 104. First object 204 is related to other objects 206 according to associations, such as associations 108 of FIG. 1, of first object 204. In this illustrative example, operator 122 navigates to other objects 206 through user input 140 interacting with the first card. Graphical user interface 122 then displays other cards for other objects 206 according to specific selection indicated in user input 140.

As depicted, each of cards 202 includes pin 208 associated there with. Pin 208 is an interactive button, icon, or other graphical element within each of cards 202. User input 140 from operator 122 that interacts with pin 208 facilitates the creation of group 210 by workflow adapter 114. For example, operator 122 views a first card displayed on graphical user interface 122. The first card is one of cards 202 and is a visual representation of first object 204 in objects 104. Operator 122 interacts with pin 208 of the first card through user input 140. In response, workflow adapter 114 initiates the creation of group 210 using group creator 212. In this illustrative example, group 210 initially including only first object 204. Operator 122 can navigate to other objects 206 and add other objects 107 to group 210 through user input 140 interacting with pin 208 of cards 202 for other objects 206.

As depicted, workflow adapter 114 has a number of different components. As used herein, a "number of items" means one or more items. For example, "a number of different components" means one or more components.

In addition to group creator 212, workflow adapter 114 includes workflow creator 214. Workflow adapter 114 includes group creator 212, and workflow creator 214. In this illustrative example, workflow creator 214 includes the functionality for creating workflows 118 for groups 116 based on receiving user input 140. User input 140 from operator 122 that interacts with cards 202 for group 210 facilitates the creation of workflow 216 by workflow adapter 114. For example, operator 122 views a card displayed on graphical user interface 122. The card is one of cards 202 and is a visual representation of group 210 in groups 116. Operator 122 interacts with the card through user input 140. In response, workflow adapter 114 initiates the creation of workflow 216 using workflow creator 214. In this illustrative example, workflow 216 is a workflow for operation 144 of FIG. 1 directed to, or for the benefit of, group 116.

Figure 3:
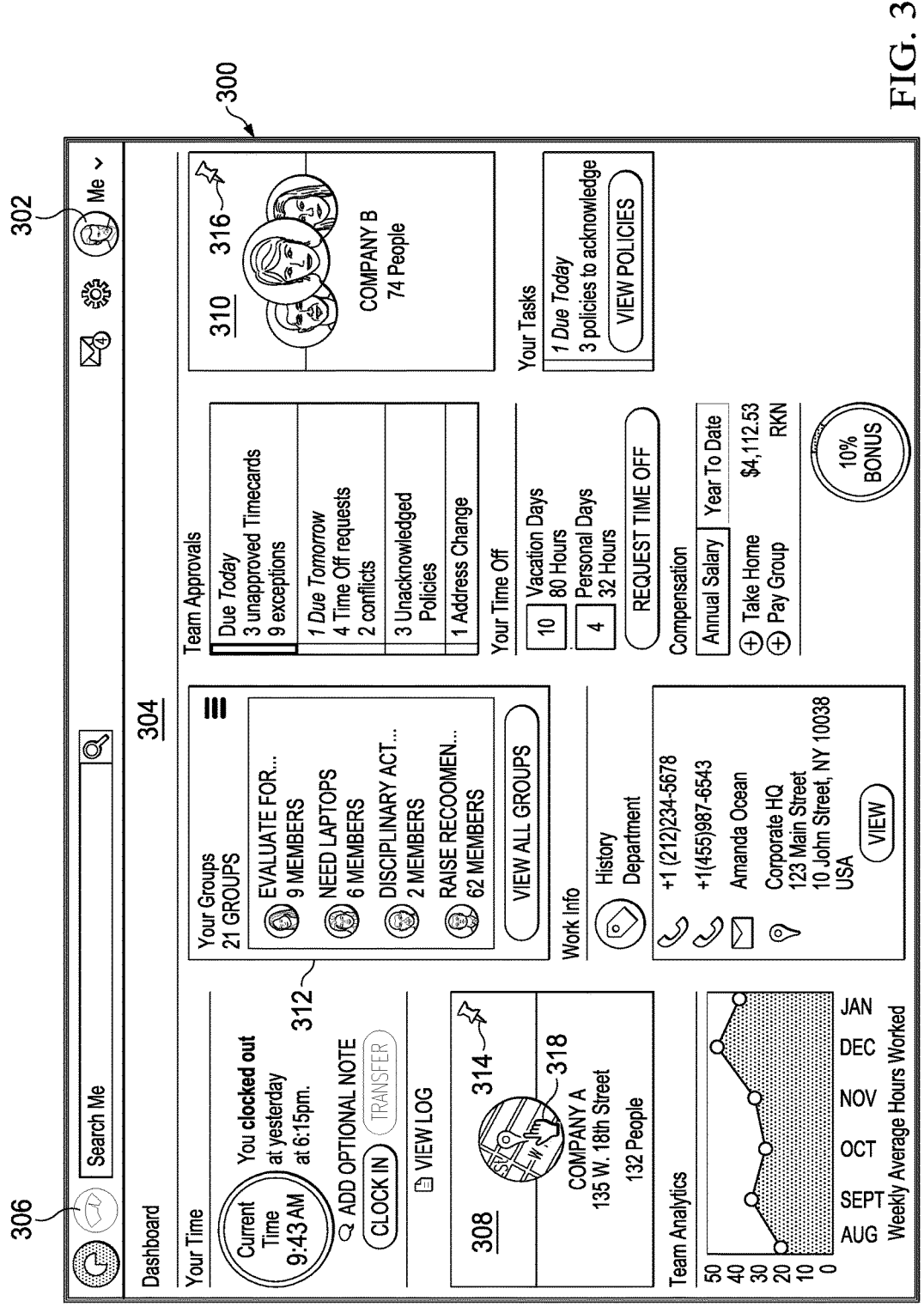
FIG. 3 is an illustration of a graphical user interface for viewing customized groups as depicted in accordance with an illustrative embodiment.

With reference now to FIG. 3, an illustration of a graphical user interface for viewing customized groups depicted in accordance with an illustrative embodiment. As depicted, graphical user interface 300 is an example of one implementation for graphical user interface 128 shown in block form in FIG. 1.

In this illustrative example, graphical user interface 300 displays a number of different graphical elements. As depicted, graphical user interface 300 includes operator 302, home screen 304, and home screen icon 306. Operator 302 is an example of operator 122 shown in block form in FIG. 1. As depicted, graphical user interface 300 displays an image and a name for operator 302.

Home screen 304 is a core interface through which operator 122 interacts with workflow system 102 of FIG. 1. Operator 122 can access home screen 304 through interaction with home screen icon 306.

In this illustrative example, home screen 304 includes a number of different graphical elements. As depicted, home screen 304 displayed in graphical user interface 300 includes card 308 and card 310. As depicted, card 308 and card 310 are examples of one implementation for cards 202 shown in block form in FIG. 2. Home screen 304 can additionally include group list 312.

Card 308 and card 310 are examples of cards 202 shown in block form in FIG. 2. As depicted, card 308 and card 310 include an image and information identifying their respective underlying objects, such as one of objects 104 shown in block form in FIG. 1. As a depicted, card 308 additionally includes pin 314 and card 310 additionally includes pin 316. As depicted, pin 314 and pin 316 are examples of one implementation for pin 208, shown in block form in FIG. 2.

As depicted, home screen 304 additionally includes group list 312. Group list 312 is a graphical element depicting a list of customized groups created by operator 302. As depicted, the customized groups shown in group list 312 are examples of one implementation for groups 116, shown in block form in FIG. 1.

In this illustrative example, card 308 may be selected. Operator 302 uses input device 142, shown in block form in FIG. 1, to move cursor 318 displayed in graphical user interface 300 over cards 308, identifying that cards 308 will be affected by user input 140, shown in block form in FIG. 1.

Figure 4:
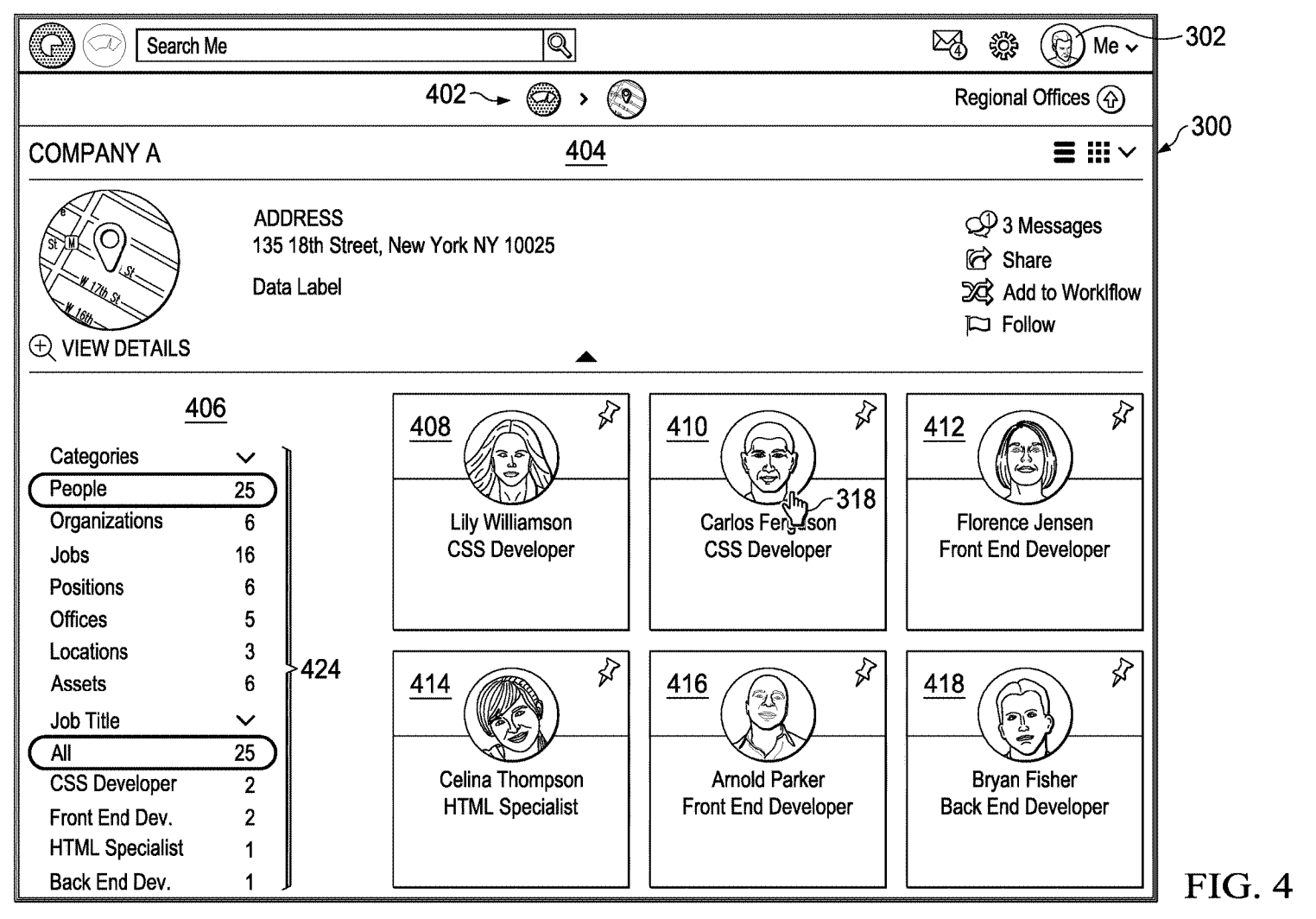

With reference now to FIG. 4, an illustration of a graphical user interface for viewing a card is depicted in accordance with an illustrative embodiment. As depicted, card 308 has been selected from graphical user interface 300 of FIG. 3. In this illustrative example, card 308 is a card for first object 204, shown in block form in FIG. 2.

In this illustrative example, graphical user interface 300 displays a number of different graphical elements. As depicted, graphical user interface 300 includes breadcrumb trail 402, card details 404, and associations 406.

Breadcrumb trail 402 is a navigation aid that allows operator 302 of FIG. 3 to track previously accessed pages or cards. Selecting an individual graphical element from within breadcrumb trail 402 allows operator 302 to quickly return to a previously accessed pager card. As depicted, breadcrumb trail 402 includes individual graphical elements for home screen 304 of FIG. 3 and card 308.

Card details 404 is a description providing additional information for selected card 308. Card details 404 can include information identifying or describing the underlying object, such as for example but not limited to a name, an address, an e-mail address, an IP address, and a telephone number.

Associations 406 displays cards for objects having an association with first object 204 of FIG. 2. In this illustrative example, associations 406 displays cards for other objects 206, shown in block form in FIG. 2. As depicted, associations 406 displays card 408, card 410, card 412, card 414, card 416, and card 418.

Associations 406 also includes association filters 424. Association filters 424 are topical filters by which operator 302 selectively filter cards that are displayed in associations 406. Association filters 424 can include categorical filters for particular ones of other objects 206, such as for example organizations, jobs, positions, offices, locations, and assets, as well as filters for particular information or characteristics of other objects 206, such as a job title. As depicted, each of card 408, card 410, card 412, card 414, card 416, and card 418 displayed in associations 406 conform to current selections among association filters 424.

In this illustrative example, card 410 may be selected. Operator 302 uses input device 142, shown in block form in FIG. 1, to move cursor 318 displayed in graphical user interface 300 over card 410, identifying that card 410 will be affected by user input 140, shown in block form in FIG. 1.

Figure 5:
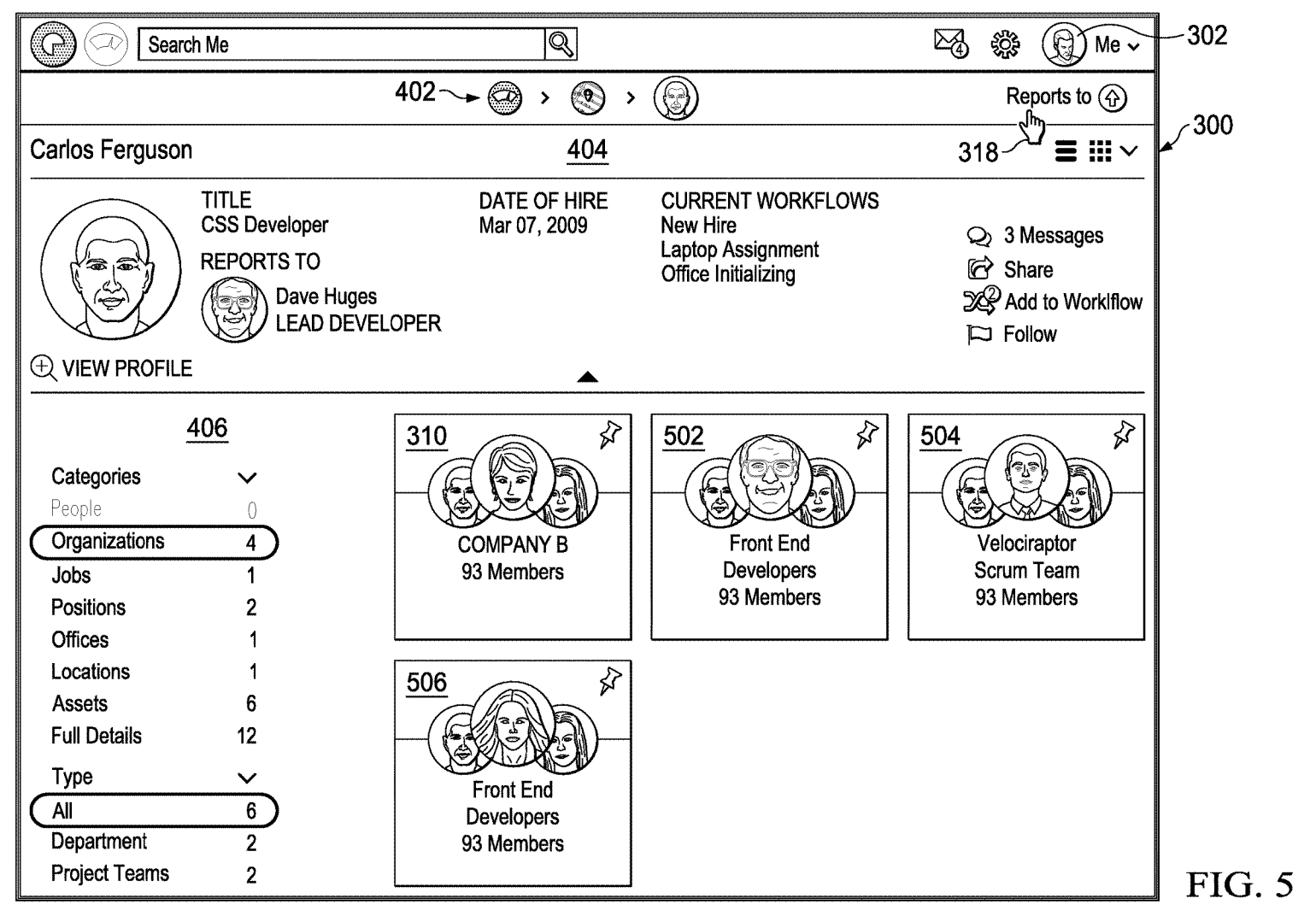

With reference now to FIG. 5, an illustration of a graphical user interface for viewing a card is depicted in accordance with an illustrative embodiment. As depicted, card 410 has been selected from graphical user interface 300 of FIG. 4. In this illustrative example, card 410 is a card for first object 204, shown in block form in FIG. 2.

As depicted, breadcrumb trail 402 is updated within a graphical user interface 300 to also indicate a selection of card 410. As depicted, breadcrumb trail 402 includes individual graphical elements for home screen 304, card 308, and card 410.

As depicted, card details 404 is updated within graphical user interface 300 to provide additional information for selected card 410. Associations 406 is also updated within graphical user interface to displays cards for objects having an association with first object 204. In this illustrative example, associations 406 displays cards for other objects 206, shown in block form in FIG. 2. As depicted, associations 406 displays card 310, card 502, card 504, and card 506.

Figure 6:
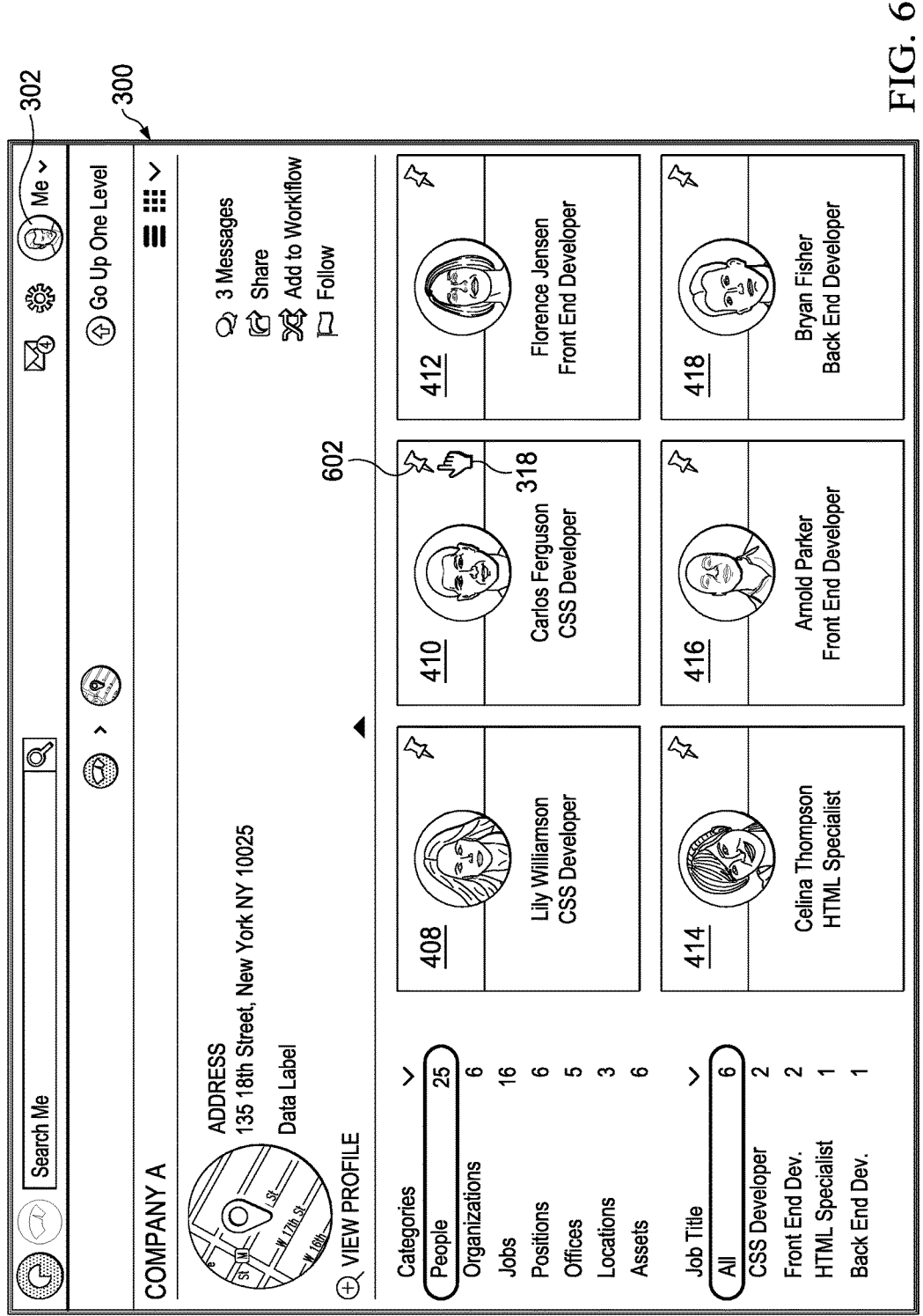
FIG. 6 is an illustration of a graphical user interface for creating a custom group from an associated card depicted in accordance with an illustrative embodiment.

With reference now to FIG. 6, an illustration of a graphical user interface for creating a custom group from an associated card is depicted in accordance with an illustrative embodiment. As depicted, graphical user interface 300 and displays card details 404 and associations 406 of card 308. In this illustrative example, card 308 is a card for first object 204, shown in block form in FIG. 2.

In this illustrative example, pin 602 of card 410 may be selected. As depicted, pin 602 is an example of one implementation for pin 208, shown in block form in FIG. 2.

Operator 302 uses input device 142, shown in block form in FIG. 1, to move cursor 318 displayed in graphical user interface 300 over pin 602 of card 410, identifying that pin 602 of card 410 will be affected by user input 140, shown in block form in FIG. 1. User input 140 from operator 122 that interacts with pin 602 facilitates the creation of a customized group that includes the related object for card 410.

Figure 7:
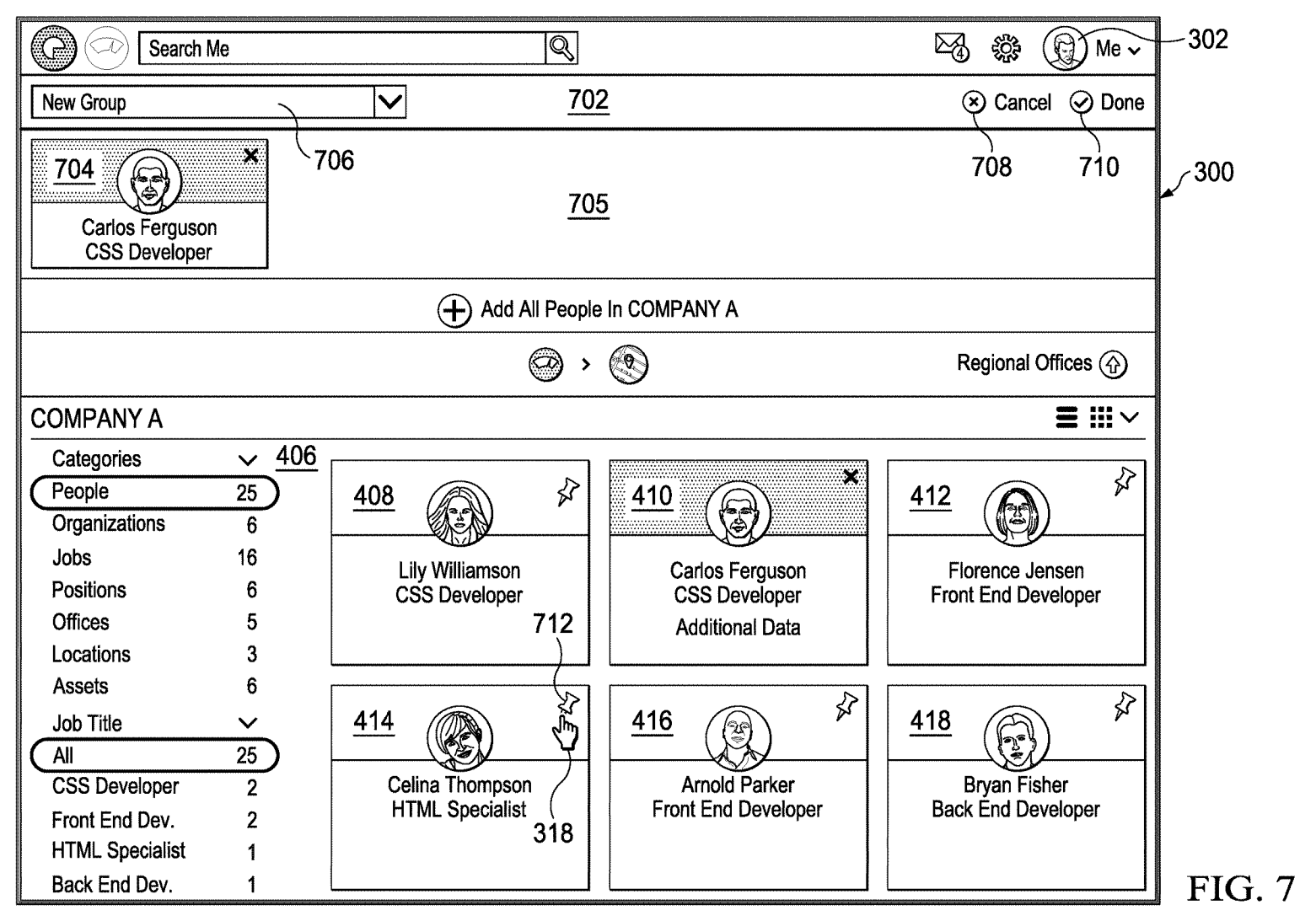

With reference now to FIG. 7, an illustration of a graphical user interface for incorporating additional cards into a custom group is depicted in accordance with an illustrative embodiment. As depicted, graphical user interface 300 and displays associations 406 of card 308. In this illustrative example, card 308 is a card for first object 204, shown in block form in FIG. 2.

In this illustrative example, graphical user interface 300 includes group creation window 702. Group creation window 702 is displayed in response to receiving user input 140 from operator 122 that interacts with pin 602, as depicted in FIG. 6.

As depicted, group creation window 702 includes selected card 704. Selected card 704 is a graphical representation of card 410 within group creation window 702, indicating that operator 302 has selected card 410 to be included within group 705.

In this illustrative example, graphical user interface 300 displays a number of different graphical elements within group creation window 702. As depicted, group creation window 702 includes group name 706, cancel button 708, and done button 710.

In this illustrative example, card 414 may be selected for inclusion within group 705. Operator 302 uses input device 142, shown in block form in FIG. 1, to move cursor 318 displayed in graphical user interface 300 over pin 712 of card 414, identifying that card 414 is to be added to group 705.

Associations 406 remains active while group creation window 702 is open. Therefore, in this illustrative example, group 705 is not limited to only cards presently displayed within associations 406, namely card 408, card 410, card 412, card 414, card 416, and card 418. Operator 302 can navigate to different cards for different associated objects, using the process similar to that described in FIGS. 4-5 above. Graphical user interface 300 updates associations 406 according to the selected card. Operator 302 can therefore select cards displayed in the updated associations 406 for inclusion in the new group.

Figure 8:
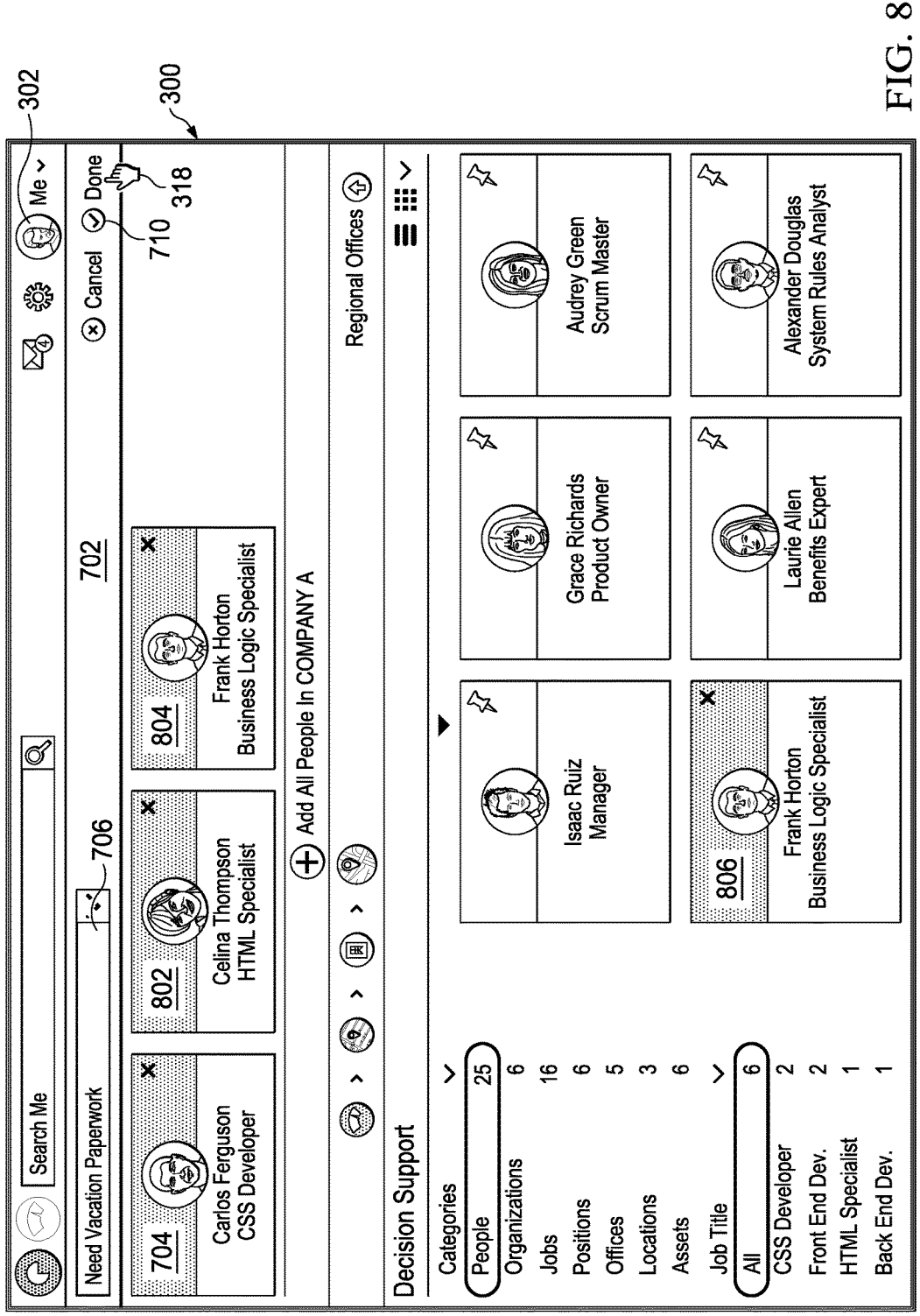
FIG. 8 is an illustration of a graphical user interface for finalizing a custom group depicted in accordance with an illustrative embodiment.

With reference now to FIG. 8, an illustration of a graphical user interface for finalizing a custom group is depicted in accordance with an illustrative embodiment. As depicted, graphical user interface 300 and displays group creation window 702 including selected card 704.

In this illustrative example, graphical user interface 300 has updated group creation window 702 to include selected card 802. Selected card 802 is a graphical representation of card 414 within group creation window 702, indicating that operator 302 has selected card 414, as shown in FIG. 7, to be included within group 705.

In this illustrative example, graphical user interface 300 has updated group creation window 702 to include selected card 804. Selected card 804 is a graphical representation of card 806 within group creation window 702, indicating that operators 302 has selected card 806, as shown in FIG. 8, to be included within group 705.

As depicted, operator 302 has updated group name 706. In this illustrative example, done button 710 may be selected, indicating a desire to finalize creation of group 705. Operator 302 uses input device 142, shown in block form in FIG. 1, to move cursor 318 displayed in graphical user interface 300 over done button 710, identifying that done button 710 will be affected by user input 140, shown in block form in FIG. 1. User input 140 from operator 122 that interacts with done button 710 completes creation of group 705. Graphical user interface 300 can then display the group 705 as a card within home screen 304 of FIG. 3.

Figure 9:
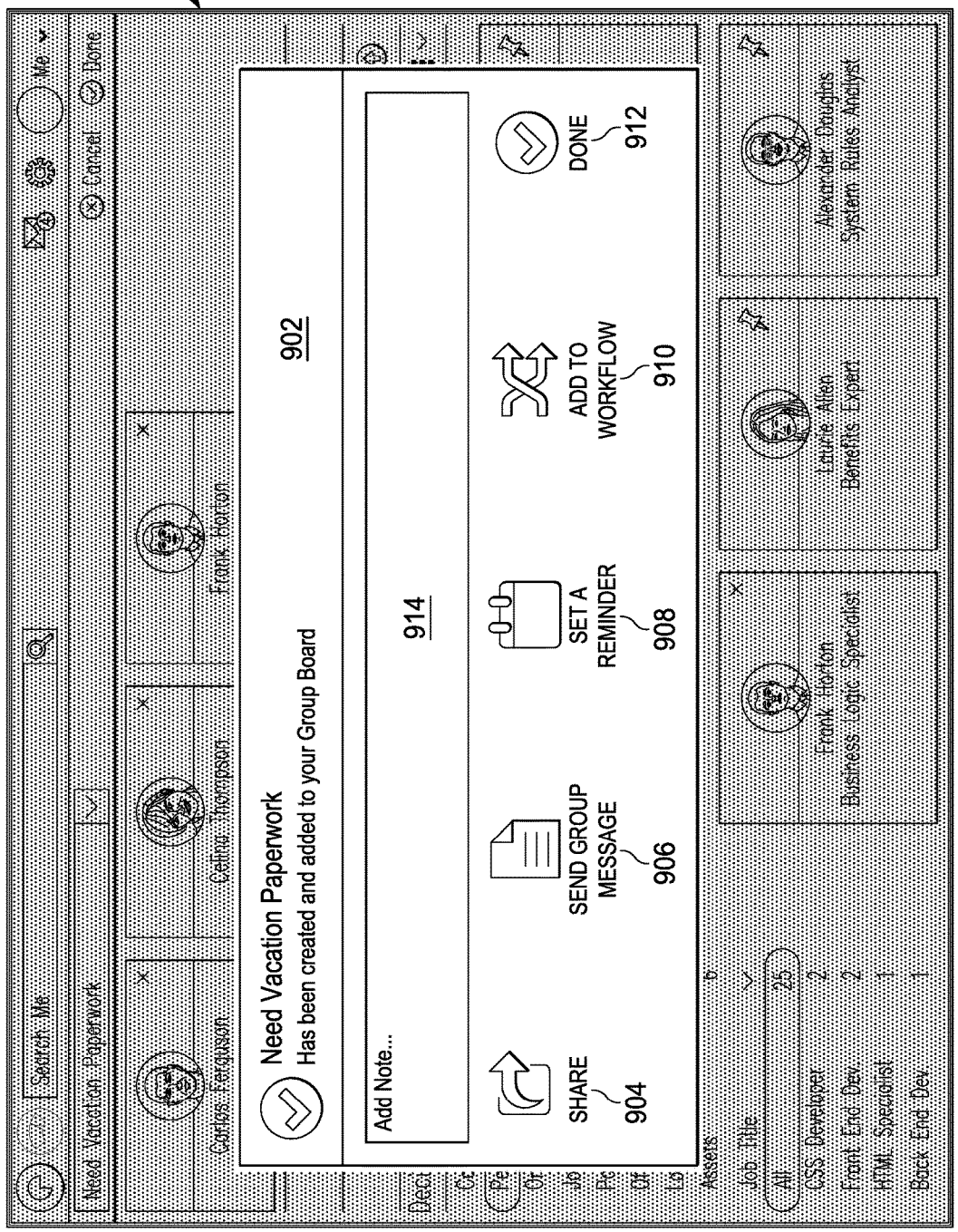
FIG. 9 is an illustration of a graphical user interface for creating additional actions in response to the creation of a custom group depicted in accordance with an illustrative embodiment.

With reference now to FIG. 9, an illustration of a graphical user interface for creating additional actions in response to the creation of a custom group is depicted in accordance with an illustrative embodiment. As depicted, graphical user interface 300 and displays additional action window 902 in response to user input 140 from operator 122 that interacts with done button 710, thereby creating group 705, as depicted in FIG. 8.

In this illustrative example, graphical user interface 300 displays a number of different graphical elements within additional action window 902. As depicted, additional action window 902 includes share button 904, send group message button 906, set a reminder button 908, add to workflow button 910, and the done button 912. Additional action window 902 also includes annotation field 914, allowing operator 302 to make notes regarding group 705.

As depicted, additional action window 902 includes share button 904. Share button 904 facilitates the sharing of group 705 with people 112, depicted in block form in FIG. 1.

As depicted, additional action window 902 includes send group message button 906. Send group message button 906 facilitates the sending of a message to people 112 included within group 705.

As depicted, additional action window 902 includes set a reminder button 908. Set a reminder button 908 can prompt operator 122 of FIG. 1 regarding operations 144 of FIG. 1 to be performed with respect to group 705.

As depicted, additional action window 902 includes add to workflow button 910. Add to workflow button 910 creates a customized workflow 216, depicted in block form in FIG. 2, for group 705. Workflow 216 allow operator 122 to perform repetitious user input 140 for operations 144 affecting objects 104 within group 705 more quickly and accurately than would otherwise be possible in systems requiring the performance of individual operation for each object included in group 705.

Figure 10:
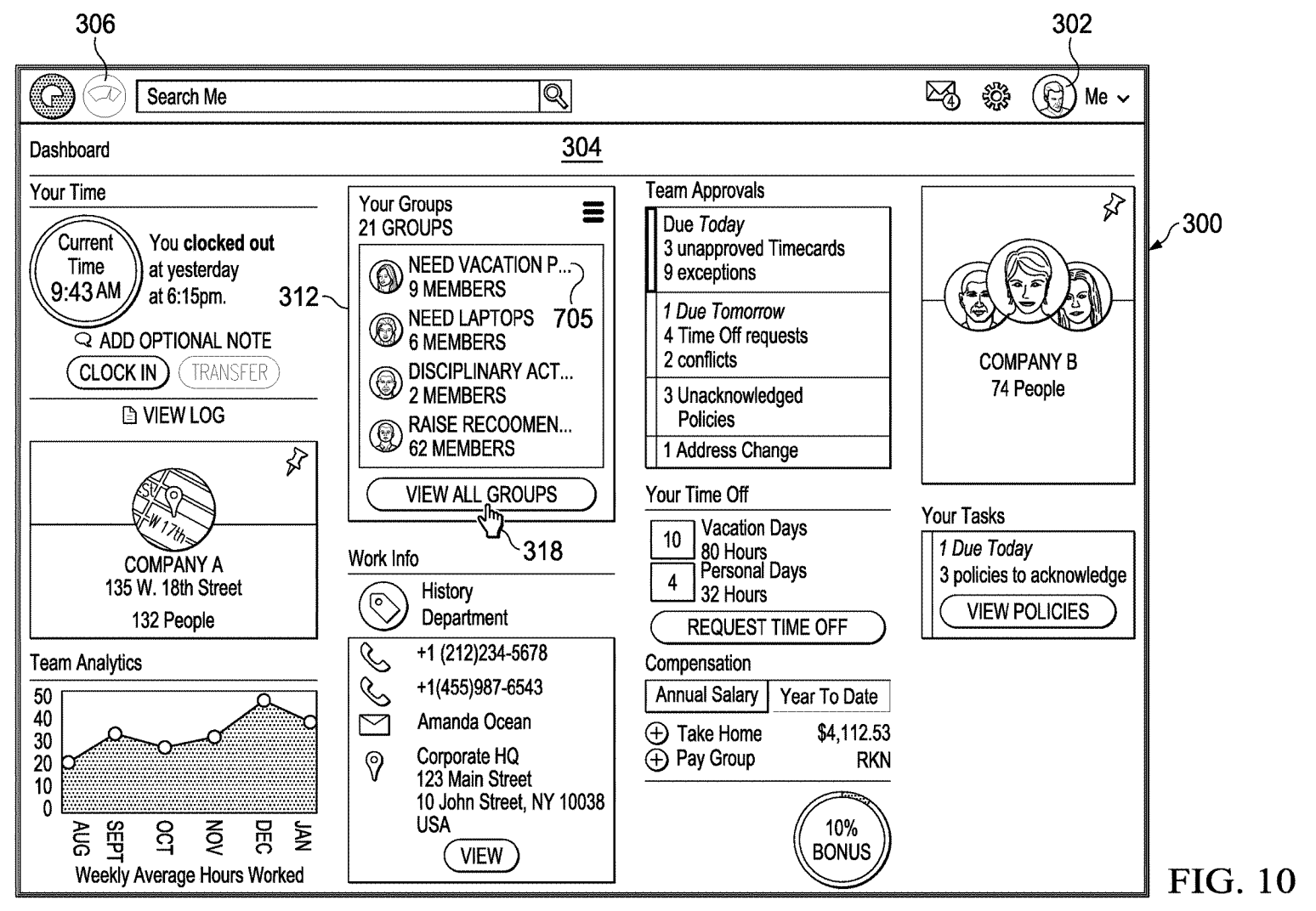

With reference now to FIG. 10, an illustration of a graphical user interface for selecting customized groups and workflows is depicted in accordance with an illustrative embodiment. As depicted, graphical user interface 300 is an example of one implementation for graphical user interface 128 shown in block form in FIG. 1.

As depicted, home screen 304 includes group list 312. As depicted, group list 312 has been updated to include group 705.

In this illustrative example, group list 312 may be selected. Operator 302 uses input device 142, shown in block form in FIG. 1, to move cursor 318 displayed in graphical user interface 300 over group list 312, identifying that group list 312 will be affected by user input 140, shown in block form in FIG. 1.

Figure 11:
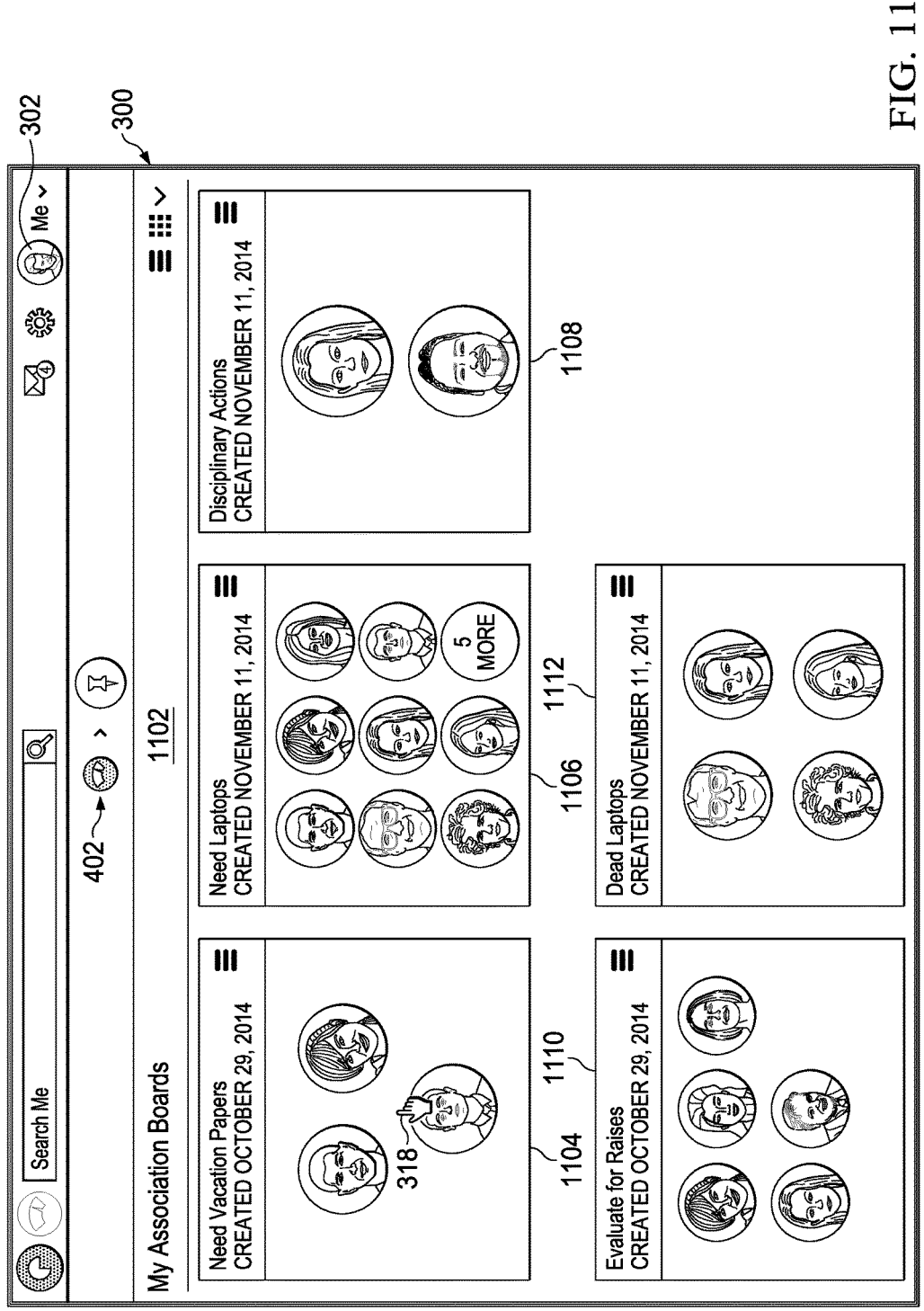
FIG. 11 is an illustration of a graphical user interface for viewing custom groups and workflows depicted in accordance with an illustrative embodiment.

With reference now to FIG. 11, an illustration of a graphical user interface for viewing customized groups and workflows is depicted in accordance with an illustrative embodiment. As depicted, group list 312 of FIG. 10 has been selected from graphical user interface 300 of FIG. 3.

In this illustrative example, graphical user interface 300 displays a number of different graphical elements. As depicted, graphical user interface 300 includes breadcrumb trail 402, and list contents 1102.

As depicted, breadcrumb trail 402 is updated within a graphical user interface 300 to indicate a selection of group list 312. As depicted, breadcrumb trail 402 includes individual graphical elements for home screen 304 of FIG. 10, and group list 312.

In this illustrative example, list contents 1102 displays cards 202 for groups 116, depicted in block form in FIG. 2, created by operator 122. As depicted, list contents 1102 displays card 1104, card 1106, card 1108, card 1110, and card 1112. As depicted, card 1104 is a card for group 705 of FIG. 7.

In this illustrative example, card 1104 may be selected. Operator 302 uses input device 142, shown in block form in FIG. 1, to move cursor 318 displayed in graphical user interface 300 over cards 1104, identifying that cards 1104 will be affected by user input 140, shown in block form in FIG. 1.

Figure 12:
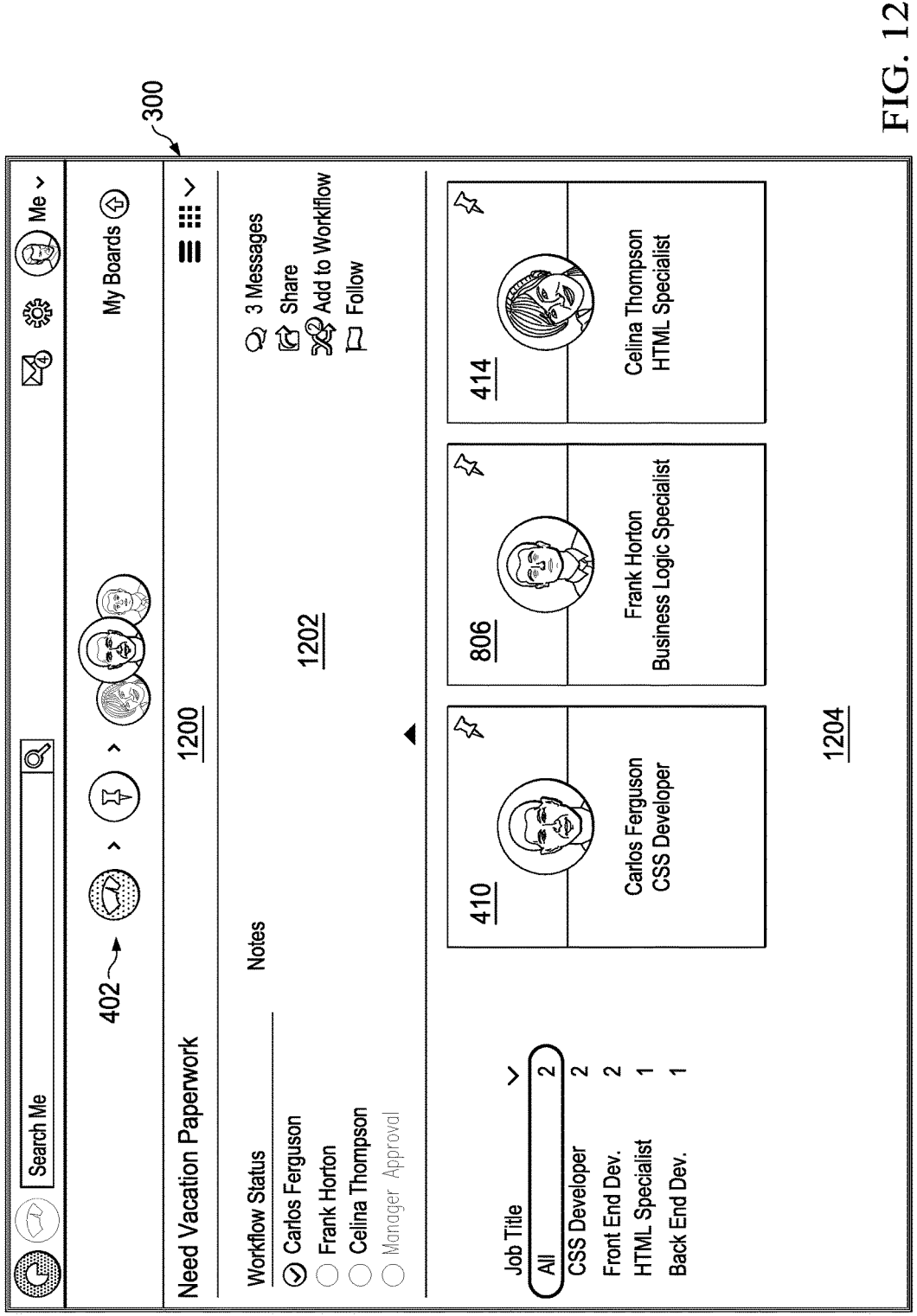
FIG. 12 is an illustration of a graphical user interface for viewing a card of a customized group depicted in accordance with an illustrative embodiment.

With reference now to FIG. 12, an illustration of a graphical user interface for viewing a card is depicted in accordance with an illustrative embodiment. As depicted, card 1104 has been selected from graphical user interface 300 of FIG. 11. As depicted, graphical user interface 300 displays card details 1200 for card 1104. In this illustrative example, card 1104 is a card for group 705 of FIG. 7.

As depicted, breadcrumb trail 402 is updated within graphical user interface 300 to indicate a selection of group 705. As depicted, breadcrumb trail 402 includes individual graphical elements for home screen 304 of FIG. 3, group list 312 of FIG. 3, and group 705.

In this illustrative example, card details 1200 includes related workflows 1202. Related workflows 1202 is a description and status of any workflows, such as workflows 118, depicted in block form in FIG. 1, related to group 705.

In this illustrative example, card details 1200 also includes associations 1204. Associations 1204 displays cards for objects that have been included in group 705. In this illustrative example, associations 1204 displays card 410, card 414, and card 806.

Figure 13:
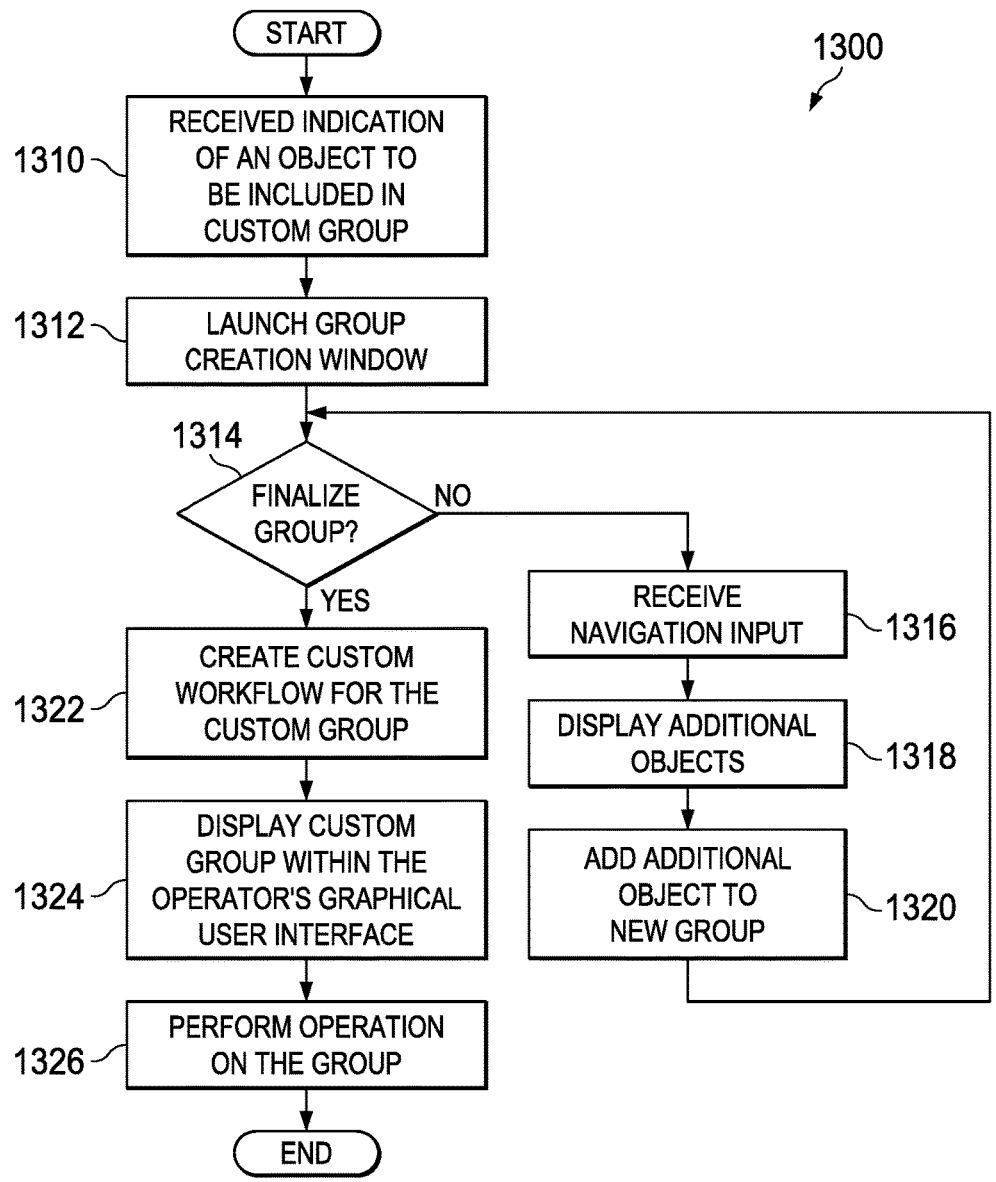
FIG. 13 is an illustration of a flowchart of a process for creating custom groups and workflows depicted in accordance with an illustrative embodiment.

Turning next to FIG. 13, an illustration of a flowchart of a process for creating custom groups and workflows is depicted in accordance with an illustrative embodiment. The process illustrated in FIG. 10 may be implemented in workflow management environment 100 shown in block form in FIG. 1. This process may be used to enable operations for organization 106. In particular, the process may be implemented in workflow adapter 114 in computer system 120.

The process 1300 begins by receiving an indication of an object to be included in a custom group (step 1310).

Responsive to receiving the indication, process 1300 launches a group creation window (step 1312).

Process 1300 then determines whether to finalize the group (step 1314).

In response to not finalizing the new group, Process 1300 receives additional user input navigating to additional objects (step 1316).

Process 1300 displays the additional objects (step 1318).

Process 1300 add additional objects to the new group in response to receiving an indication that the object should be included in the custom group (step 1320). Process 1300 and returns to step 1314.

Returning now to step 1314, in response receiving an indication to finalize the group ("yes" at step 1314), process 1300 creates custom workflow for the custom group (step 1322).

Process 1300 and displays the custom group within the users the operators graphical user interface (step 1324).

Process 1300 then performs an operation on the custom group in response to receiving a user interaction with the custom group (step 1326), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 14:
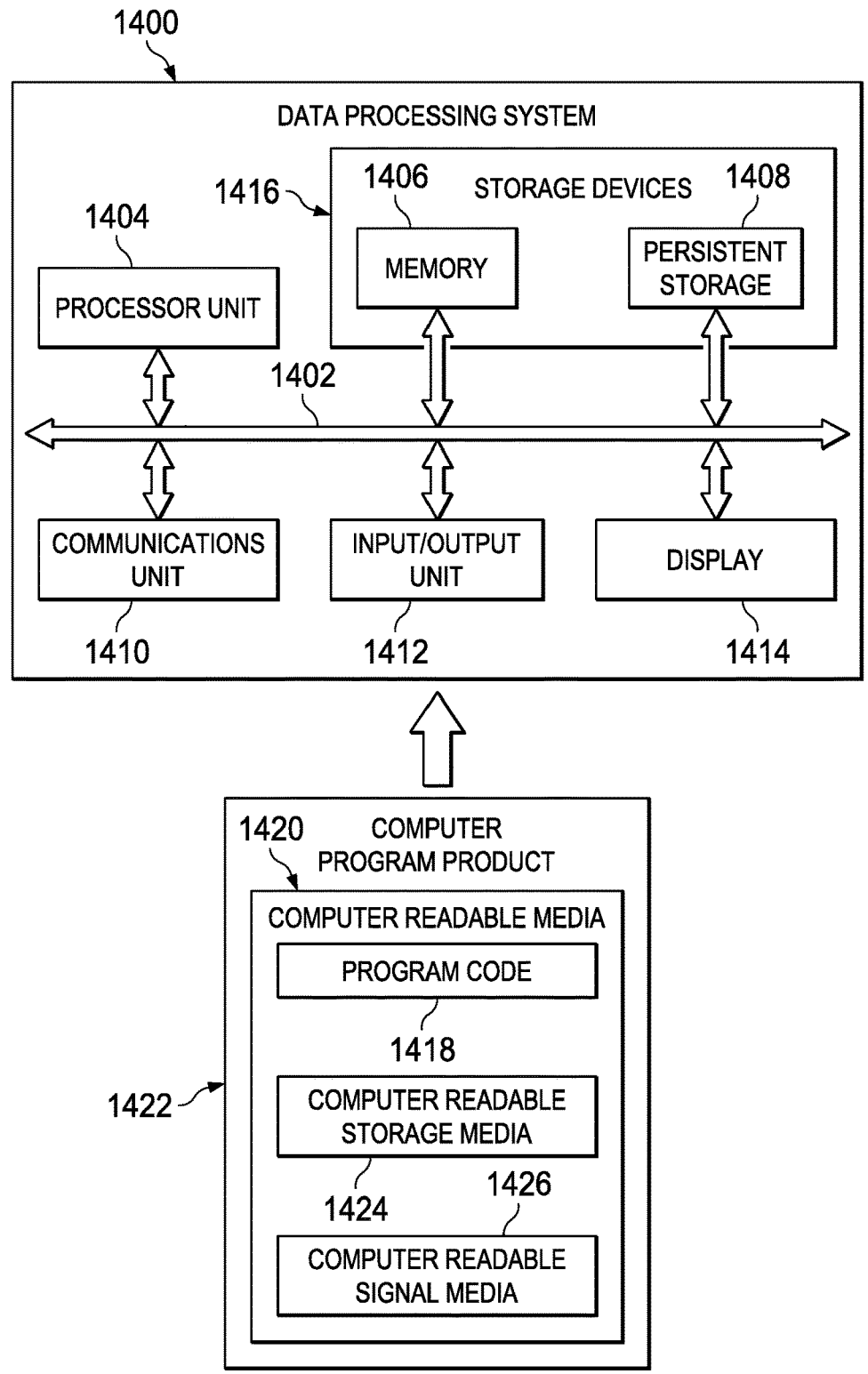
FIG. 14 is an illustration of a block diagram of a data processing system depicted in accordance with an illustrative embodiment.

Turning now to FIG. 14, an illustration of a block diagram of a data processing system is depicted in accordance with an illustrative embodiment. Data processing system 1400 may be used to implement computer system 120 in FIG. 1. In this illustrative example, data processing system 1400 includes communications framework 1402, which provides communications between processor unit 1404, memory 1406, persistent storage 1408, communications unit 1410, input/output unit 1412, and display 1414. In this example, communications framework 1402 may take the form of a bus system.

Processor unit 1404 serves to execute instructions for software that may be loaded into memory 1406. Processor unit 1404 may be a number of processors, a multi-processor core, or some other type of processor, depending on the particular implementation.

Memory 1406 and persistent storage 1408 are examples of storage devices 1416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1416 may also be referred to as computer readable storage devices in these illustrative examples. Memory 1406, in these examples, may be, for example, a random access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that may be connected to data processing system 1400. For example, input/output unit 1412 may provide a connection for user input through at least of a keyboard, a mouse, or some other suitable input device. Further, input/output unit 1412 may send output to a printer. Display 1414 provides a mechanism to display information to a user.

Instructions for at least one of the operating system, applications, or programs may be located in storage devices 1416, which are in communication with processor unit 1404 through communications framework 1402. The processes of the different embodiments may be performed by processor unit 1404 using computer-implemented instructions, which may be located in a memory, such as memory 1406.

These instructions are referred to as program code, computer usable program code, or computer readable program code that may be read and executed by a processor in processor unit 1404. The program code in the different embodiments may be embodied on different physical or computer readable storage media, such as memory 1406 or persistent storage 1408.

Program code 1418 is located in a functional form on computer readable media 1420 that is selectively removable and may be loaded onto or transferred to data processing system 1400 for execution by processor unit 1404. Program code 1418 and computer readable media 1420 form computer program product 1422 in these illustrative examples. In one example, computer readable media 1420 may be computer readable storage media 1424 or computer readable signal media 1426.

In these illustrative examples, computer readable storage media 1424 is a physical or tangible storage device used to store program code 1418 rather than a medium that propagates or transmits program code 1418. Alternatively, program code 1418 may be transferred to data processing system 1400 using computer readable signal media 1426. Computer readable signal media 1426 may be, for example, a propagated data signal containing program code 1418. For example, computer readable signal media 1426 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1400 are not meant to provide architectural limitations to the manner in which different embodiments may be implemented. The different illustrative embodiments may be implemented in a data processing system including components in addition to or in place of those illustrated for data processing system 1400. Other components shown in FIG. 14 can be varied from the illustrative examples shown. The different embodiments may be implemented using any hardware device or system capable of running program code 1418.

Thus, the illustrative examples in the different figures provide one or more technical solutions to overcome a technical problem of having amounts of information that make the managing of assets and performing operations on those assets people more cumbersome and time-consuming than desired. For example, workflow adapter 114 creates customized groups 116 of objects 104 and creates customized workflows 118 for at least one of objects 104 and groups 116. As another example, workflow adapter 114 enables operator 122 to more efficiently perform operation 144 based on creation of customized groups 116 of objects 104 and customized workflows 118.

In this manner, the use of workflow adapter 114 has a technical effect of reducing time, effort, or both in managing of assets of organization 106. In this manner, operation 144 performed for organization 106 may be performed more efficiently as compared to currently used systems for managing assets and workflows for people 112. For example, groups 116 and workflows 118 may be used to enable operation 144, selected from at least one of hiring, benefits administration, payroll, performance reviews, forming teams for new products, assigning research projects, or other suitable operations for organization 106.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for creating custom groups of objects in a computerized workflow system, the method comprising:
   identifying, by a computer system, an object within a network;
   displaying, by the computer system, a first visual representation of the object on a graphical user interface, wherein the first visual representation of the object is a card including an interactive pin that facilitates creation of a custom group;
   receiving, by the computer system, a selection of the object;
   in response to receiving the selection of the object:
     displaying details about the object in a first section of a graphical user interface,
     displaying a set of visual representations for an associated set of objects in a second section of the graphical user interface, wherein the associated set of objects is associated with the object, and
     updating a breadcrumb trail displayed in the graphical user interface to include the object;
   responsive to receiving a user interaction with the pin:
     graphically changing the pin in the first visual representation of the object to facilitate removing the object from the custom group,
     displaying a second visual representation of the object in a group creation window on the graphical user interface, wherein the second visual representation also includes a graphical element to facilitate removing the object from the custom group, and
     creating the custom group based on visual representations of objects displayed in the group creation window, wherein the custom group includes the object, wherein the custom group is a loose association of objects within the network and does not exist as a separate object within the network; and
   performing, by the computer system, an operation on the custom group, wherein the operation on the custom group comprises a single operation that creates a workflow for each object in the custom group.

2. The method of claim 1, further comprising:
   responsive to receiving the selection of the card of the object, identifying, by the computer system, the set of objects associated with the object by a relationship that links the object with the set of objects; and
   displaying, by the computer system, the set of visual representations for the set of objects in the second section of the graphical user interface.

3. The method of claim 2, further comprising:
   receiving, by the computer system, a filter selection for the set of visual representations for the set of objects; and
   displaying, by the computer system, in the second section of the graphical user interface, ones of the set of visual representations for the set of objects according to the filter selection.

4. The method of claim 2, further comprising:
   receiving, by the computer system, a selection of an associated object from the set of objects;
   responsive to receiving the selection of the associated object, displaying a second set of visual representations for an associated second set of objects, and updating the breadcrumb trail to include the associated object;
   responsive to receiving the selection of the associated object, identifying, by the computer system, the second set of objects associated with the associated object by a relationship that links the associated object with the second set of objects;
   displaying details about the associated object in the first section of the graphical user interface;
   displaying, by the computer system, a second set of visual representations for the second set of objects in the second section of the graphical user interface; and
   updating the breadcrumb trail to include the associated object.

5. The method of claim 4, wherein the breadcrumb trail is a navigation aid that allows an operator to track previously accessed cards.

6. The method of claim 2, further comprising:
   receiving, by the computer system, a selection of a pin of an associated object from the set of objects;
   responsive to receiving the selection of the pin of the associated object, displaying the visual representation of the associated object in a group creation window on the graphical user interface; and
   including, by the computer system, the associated object within the custom group.

7. The method of claim 1, wherein performing the operation on the custom group further comprises:
   receiving, by the computer system, the operation directed to the custom group; and
   wherein the operation that creates the workflow for each object in the custom group is performed in response to receiving the operation directed to the custom group.

8. The method of claim 1, wherein the operation is selected from one of the group consisting of: hiring operations, benefits administration operations, payroll operations, performance review operations, team formation operations, research project assignment operations, and combinations thereof.

9. A computer system comprising:
   a display system; and
   a workflow adapter of a workflow management system in the computer system in communication with the display system, wherein the workflow adapter:
     identifies an object within a network;
     displays a first visual representation of the object on a graphical user interface, wherein the first visual representation of the object is a card including an interactive pin that facilitates creation of a custom group;
     in response to receiving the selection of the object:

displays details about the object in a first section of a graphical user interface, displays a set of visual representations for an associated set of objects in a second section of the graphical user interface, wherein the associated set of objects is associated with the first object, and updates a breadcrumb trail to include the object;

in response to receiving a user interaction with the pin:

graphically changes the pin in the first visual representation of the object to facilitate removing the object from the custom group, displays a second visual representation of the object in the group creation window on the graphical user interface, wherein the second visual representation also includes a graphical element to facilitate removing the object from the custom group, and creates the custom group based on the visual representations of objects displayed in the group creation window, wherein the custom group includes the object, wherein the custom group is a loose association of objects within the network and does not exist as a separate object within the network; and performs an operation on the custom group, wherein the operation on the custom group comprises a single operation that creates a workflow for each object in the custom group.

10. The computer system of claim 9, wherein the workflow adapter:

identifies the set of objects associated with the object by a relationship that links the object with the set of objects in response to receiving the selection of the card of the object; and displays the set of visual representations for the set of objects in the second section of the graphical user interface.

11. The computer system of claim 10, wherein the workflow adapter:

receives a filter selection for the set of visual representations for the set of objects; and displays ones of the set of visual representations for the set of objects according to the filter selection.

12. The computer system of claim 10, wherein the workflow adapter:

receives a selection of an associated object from the set of objects; identifies a second set of objects associated with the associated object by a relationship that links the associated object with the second set of objects in response to receiving the selection of the associated object; and displays a second set of visual representations for the second set of objects.

13. The computer system of claim 12, wherein the workflow adapter:

displays the object and the associated object in a navigation aid that allows an operator to track previously accessed cards, wherein the navigation aid is a breadcrumb trail.

14. The computer system of claim 10, wherein the workflow adapter:

receives, a selection of a pin of an associated object from the set of objects; and includes the associated object within the custom group in responsive to receiving the selection of the pin of the associated object.

15. The computer system of claim 9, wherein performing the operation on the custom group further comprises:

receiving an operation directed to the custom group; and wherein the operation that creates the workflow for each object in the custom group is performed in response to receiving the operation directed to the custom group.

16. The computer system of claim 9, wherein the operation is selected from one of the group consisting of: hiring operations, benefits administration operations, payroll operations, performance review operations, team formation operations, research project assignment operations, and combinations thereof.

17. A computer program product for creating custom groups of objects in a computerized workflow system, the computer program product comprising:

a computer readable storage media;

first program code, stored on the computer readable storage media, for identifying an object within a network;

second program code, stored on the computer readable storage media, for displaying a first visual representation of the object on a graphical user interface, wherein the first visual representation of the object is a card including interactive pin that facilitates creation of a custom group;

third program code, stored on the computer readable storage media, for receiving a selection of the object;

fourth program code, stored on the computer readable storage media, for responsive to receiving the selection of the object:

displaying details about the object in a first section of a graphical user interface, displaying a set of visual representations for an associated set of objects and a second section of the graphical user interface, wherein the associated set of objects is associated with the object, and updating a breadcrumb trail to include the object;

fifth program code, stored on the computer readable storage media, for, responsive to receiving a user interaction with the pin:

graphically changing the pin in the first visual representation of the object to facilitate removing the object from the custom group, displaying a second visual representation of the object in a group creation window on the graphical user interface, wherein the second visual representation also includes a graphical element to facilitate removing the object from the custom group, and creating the custom group based on visual representations of objects displayed in the group creation window, wherein the custom group includes the object, wherein the custom group is a loose association of objects within the network and does not exist as a separate object within the network; and seventh program code, stored on the computer readable storage media, for performing an operation on the custom group, wherein the operation on the custom group comprises a single operation that creates a workflow for each object in the custom group.

18. The computer program product of claim 17, further comprising:

program code, stored on the computer readable storage media, for identifying the set of objects associated with the object by a relationship that links the object with the set of objects in response to receiving the selection of the card; and program code, stored on the computer readable storage media, for displaying a set of visual representations for the set of objects in the second section of the graphical user interface.

19. The computer program product of claim 18, further comprising:
    program code, stored on the computer readable storage media, for receiving a filter selection for the set of visual representations for the set of objects; and
    program code, stored on the computer readable storage media, for displaying ones of the set of visual representations for the set of objects according to the filter selection.

20. The computer program product of claim 18, further comprising:
    program code, stored on the computer readable storage media, for receiving a selection of an associated object from the set of objects;
    program code, stored on the computer readable storage media, for identifying a second set of objects associated with the associated object by a relationship that links the associated object with the second set of objects in response to receiving the selection of the associated object; and
    program code, stored on the computer readable storage media, for displaying a second set of visual representations for the second set of objects.

21. The computer program product of claim 20, further comprising:
    program code, stored on the computer readable storage media for displaying the object and the associated object in a navigation aid that allows an operator to track previously accessed cards, wherein the navigation aid is a breadcrumb trail.

22. The computer program product of claim 18, further comprising:
    program code, stored on the computer readable storage media, for receiving a selection of a pin of an associated object from the set of objects; and
    program code, stored on the computer readable storage media, for including the associated object within the custom group in response to receiving the selection of the pin of the associated object.

23. The computer program product of claim 17, wherein performing the operation on the custom group further comprises:
    program code, stored on the computer readable storage media, for receiving an operation directed to the custom group; and
    wherein the program code for performing the operation that creates the workflow for each object in the custom group is executed in response to receiving the operation directed to the custom group.

24. The computer program product of claim 17, wherein the operation is selected from one of the group consisting of: hiring operations, benefits administration operations, payroll operations, performance review operations, team formation operations, research project assignment operations, and combinations thereof.

* * * * *